United States Patent
Stewart, III (10) Patent No.: US 11,318,520 B2
(45) Date of Patent: May 3, 2022

(54) STRETCH FORMING METHOD FOR A SHEET METAL SKIN WITH CONVEX AND CONCAVE CURVATURES

(71) Applicant: John Ralph Stewart, III, Jamul, CA (US)

(72) Inventor: John Ralph Stewart, III, Jamul, CA (US)

( * ) Notice: Subject to any disclaimer, the term of this patent is extended or adjusted under 35 U.S.C. 154(b) by 418 days.

(21) Appl. No.: 16/236,618

(22) Filed: Dec. 30, 2018

(65) Prior Publication Data

US 2020/0206799 A1    Jul. 2, 2020

(51) Int. Cl.
*B21D 25/02*    (2006.01)
*B21D 53/92*    (2006.01)
*B64D 29/00*    (2006.01)

(52) U.S. Cl.
CPC ............. *B21D 25/02* (2013.01); *B21D 53/92* (2013.01); *B64D 29/00* (2013.01)

(58) Field of Classification Search
CPC ........ B21D 25/00; B21D 25/02; B21D 25/04; B21D 53/92
USPC ........................................... 72/296, 302, 311
See application file for complete search history.

(56) References Cited

U.S. PATENT DOCUMENTS

| | | | | |
|---|---|---|---|---|
| 4,698,995 A | * | 10/1987 | Chorneau | B21D 25/02 72/297 |
| 5,115,661 A | * | 5/1992 | McGowan | B21D 25/02 72/20.2 |
| 5,771,730 A | * | 6/1998 | Huet | B21D 9/15 72/58 |
| 6,272,897 B1 | * | 8/2001 | Ciranna | B21D 25/02 72/296 |
| 7,340,933 B2 | * | 3/2008 | Stewart | B21D 25/02 72/296 |
| 2004/0148997 A1 | * | 8/2004 | Amino | B21D 25/02 72/297 |
| 2007/0102493 A1 | * | 5/2007 | Polen | B21D 25/02 228/136 |

* cited by examiner

*Primary Examiner* — Teresa M Ekiert (57) ABSTRACT

A method of forming sheet metal skins of the inner fixed structure of a blocker door thrust reverser assembly having convex and concave curvatures. The method includes plastically stretching a sheet of metal about a mandrel having a chordwise central first axis to form a substantially convex shape. The method further includes the addition of features after the substantially convex shape is formed to facilitate plastically stretching a portion or portions of the substantially convex shape into a substantially concave shape about an axis that is substantially parallel to the chordwise central first axis.

2 Claims, 10 Drawing Sheets

STRETCH FORMING METHOD FOR A SHEET METAL SKIN WITH CONVEX AND CONCAVE CURVATURES

CROSS-REFERENCE TO RELATED APPLICATIONS

Not Applicable,

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

The invention relates to methods of producing sheet metal skins having convex and concave curvatures, and more particularly relates to a method of stretch forming sheet metal skins of the inner fixed structure of a blocker door thrust reverser assembly.

BACKGROUND OF THE INVENTION

Aircraft engine nacelles provide streamlined enclosures for aircraft engines. The nacelles are typically comprised of a forward inlet assembly, a center fan cowl assembly, and an aft thrust reverser assembly. The thrust reverser assembly portion of the nacelle is a highly engineered aerodynamic structure that can mechanically alter the direction of the aircraft engine thrust from a substantially aftward direction to a partially forward direction. This change in direction of a portion of the aircraft engine thrust is accomplished by electrically or hydraulically actuated means and is useful for reducing the speed of an aircraft upon landing.

Various thrust reverser designs are in use on commercial aircraft. For example, the thrust reverser in use on the McDonnell Douglas MD-80 Aircraft is commonly referred to as a clamshell design. In a clamshell thrust reverser design, the aircraft engine thrust is partially reversed by mechanically repositioning the outer panels of the clamshell thrust reverser behind the aircraft engine and into the thrust stream. The Boeing 717 Aircraft uses a thrust reverser commonly referred to as a pre-exit design. In a pre-exit thrust reverser design, the aircraft engine thrust is partially reversed by mechanically pivoting the outer panels of the pre-exit thrust reverser into the bypass air thrust stream. The thrust reverser design used on the Boeing 737MAX, Airbus A320NEO, Boeing 787, and Boeing 747-8 aircraft is commonly referred to as a blocker door thrust reverser design. In a blocker door thrust reverser design, the aircraft engine thrust is partially reversed by mechanically translating the outer portion of the thrust reverser in an aftward direction while simultaneously positioning blocker doors into the bypass thrust stream.

The blocker door thrust reverser assembly is comprised of many subassemblies. The invention relates to the blocker door thrust reverser subassembly commonly referred to as the inner fixed structure, and more particularly relates to a method of stretch forming sheet metal skins of the inner fixed structure of a blocker door thrust reverser assembly.

Composite layup is one traditional method used to produce an inner fixed structure of a blocker door thrust reverser assembly. The composite layup manufacturing method consists of the layup and bonding of an outer perforated composite skin, an inner solid composite skin, and an intermediate honeycomb core assembly to result in a rigid sandwich structure that is lightweight and effective at noise attenuation. Unfortunately, composite layup inner fixed structures are expensive to produce and costly to maintain and repair while in service. In addition, since inner fixed structures of a blocker door thrust reverser assembly are in close proximity to hot areas of the jet engine case, a composite layup inner fixed structure must be protected from the hot jet engine case by insulating means such as insulating blankets. Insulating blankets are expensive to produce, heavy, are bulky and thereby reduce bypass thrust ratio area, are susceptible to damage, and often require periodic refurbishment or replacement. Furthermore, the tooling and equipment required to produce a composite layup inner fixed structure can be expensive to purchase and costly to maintain.

Another common method of producing an inner fixed structure is metal bonding. The metal bonding manufacturing method consists of the layup and bonding of a sheet metal outer perforated skin, an inner solid sheet metal skin, and an intermediate honeycomb core assembly to result in a rigid sandwich structure with acoustic attenuation benefits. Unfortunately, because of the complex shape of the outer perforated sheet metal skin and the inner solid sheet metal skin, these skins are manufactured in multiple pieces and assembled by means of splice joints. These splice joints increase assembly complexity, add weight, reduce acoustic attenuation area, increase finished assembly tolerances, result in rework and scrap, and add cost. In addition, inner fixed structure metal bonded panels commonly manufactured from aluminum must also be protected from the hot jet engine case by insulating means such as insulating blankets.

Thus, there is a need for an alternative, less costly, more efficient, more effective, and less time-consuming process for producing sheet metal skins of the inner fixed structure of a blocker door thrust reverser assembly.

BRIEF SUMMARY OF THE INVENTION

The invention includes a stretch forming process for producing a thin metal skin having convex and concave curvatures. The method includes plastically stretching a sheet of metal into a substantially convex shape about a chordwise central first axis. The method further includes plastically stretching a portion or portions of the substantially convex shape into a substantially concave shape about an axis that is substantially parallel to the chordwise central first axis.

The invention also includes a method of forming sheet metal skins of the inner fixed structure of a blocker door thrust reverser assembly having convex and concave curvatures. The method includes plastically stretching a sheet of metal about a mandrel having a chordwise central first axis to form a substantially convex shape. The method further includes the addition of features after the substantially convex shape is formed to facilitate plastically stretching a portion or portions of the substantially convex shape into a substantially concave shape about an axis that is substantially parallel to the chordwise central first axis.

These and other aspects of the invention will be understood from a reading of the following detailed description together with the drawings.

DETAILED DESCRIPTION OF THE INVENTION

Figure 1:
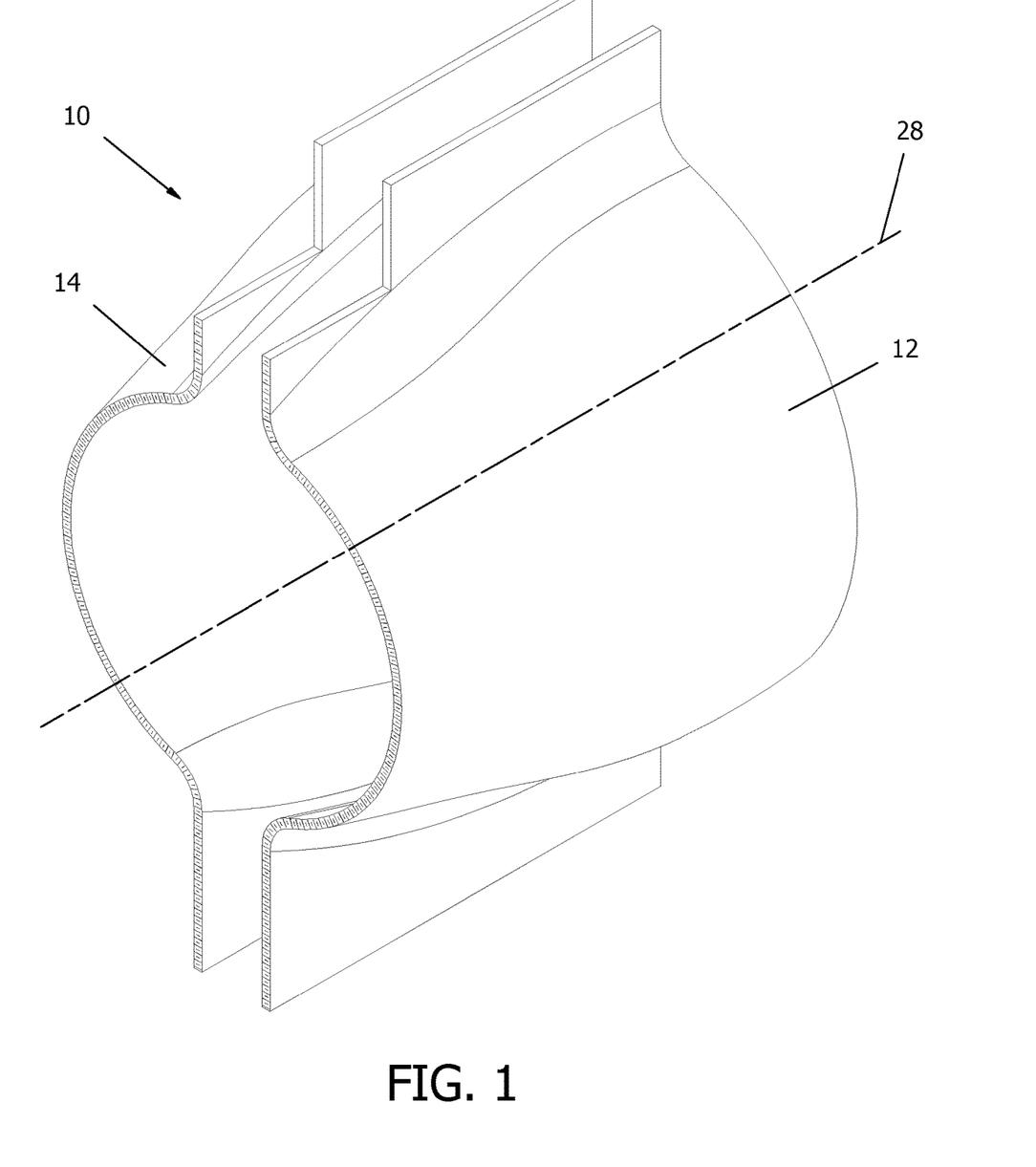
FIG. 1 is a perspective view of an inner fixed structure subassembly in aircraft orientation comprised of a left-hand panel and a right-hand panel produced by a method according to the invention.

FIG. 1 shows an inner fixed structure subassembly 10 in aircraft orientation comprised of a left-hand panel 12 and a right-hand panel 14 produced by a method according to the invention. As shown in FIG. 1, the left-hand panel 12 and right-hand panel 14 includes a chordwise central axis 28 about which the left-hand panel 12 and right-hand panel 14 curves in a substantially spanwise direction. As used herein, a "chordwise axis" extends between a forward (or leading edge) position and an aft (or trailing edge) position, or extends substantially parallel to a forward-aft direction. In addition, as used herein, a "spanwise axis" extends in a direction that is substantially perpendicular to a chordwise axis, and extends along or parallel to the span of an elongated structure, or along or parallel to the circumference of a circular or semi-circular structure. In addition, as used herein, "chordwise" describes a direction or orientation that is substantially parallel to a chordwise axis, and "spanwise" describes a direction or orientation that is substantially parallel to a spanwise axis. In FIG. 1, the chordwise central axis 28 substantially coincides with a central longitudinal axis of an associated aircraft engine, and the center of the engine's thrust reverser assembly.

Figures 2, 3:
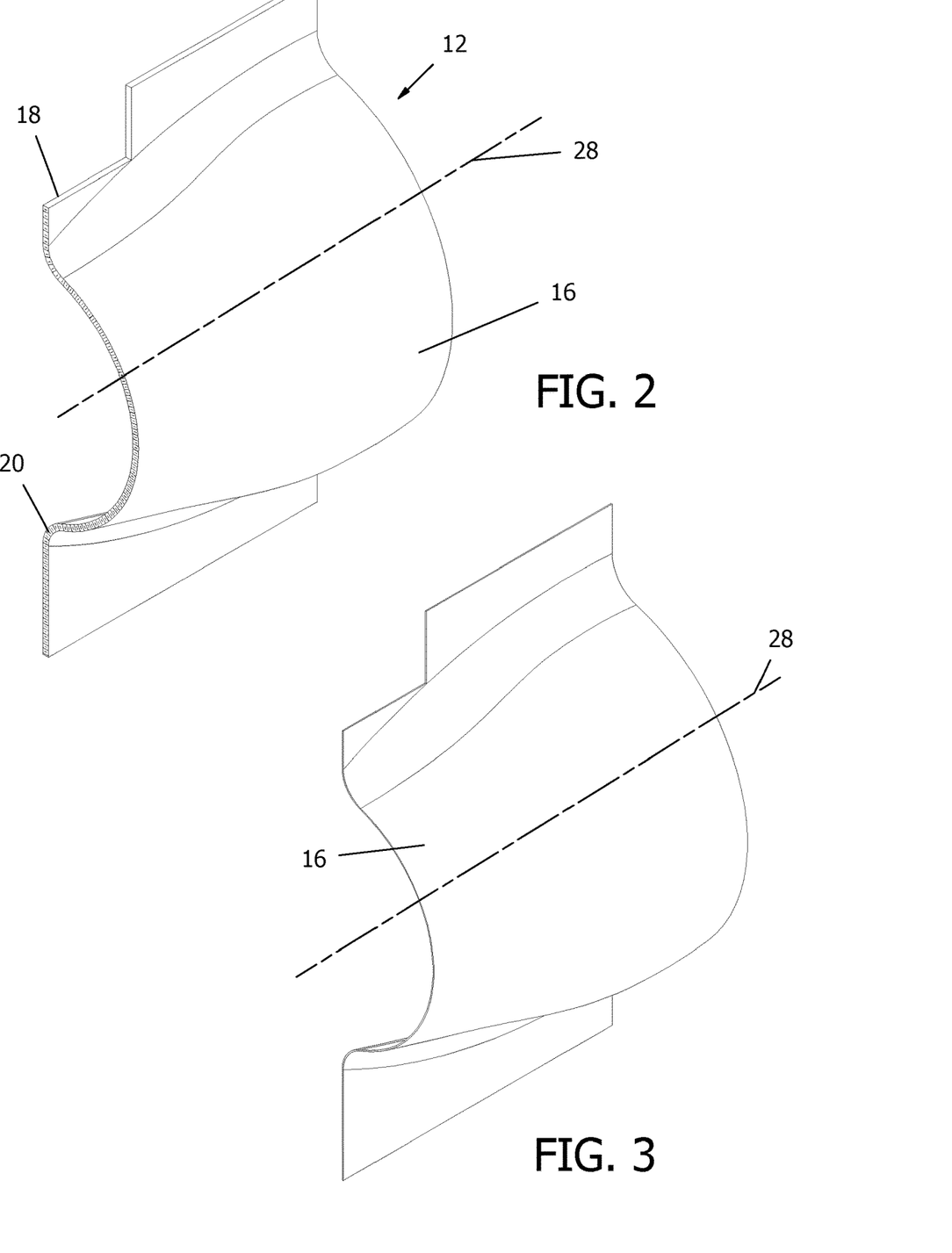
FIG. 2 is a perspective view of the left-hand inner fixed structure panel comprised of an outer skin, an inner skin, and an intermediate honeycomb core assembly of the inner fixed structure subassembly shown in FIG. 1.
FIG. 3 is a perspective view of the outer skin of the left-hand inner fixed structure panel shown in FIG. 2.

FIG. 2 shows the left-hand panel 12 produced by a method according to the invention. The left-hand panel 12 is comprised of a sheet metal outer perforated skin 16, a sheet metal inner solid skin 18, and an intermediate honeycomb core assembly 20 that is bonded together by any suitable or desired bonding or joining process to result in a rigid structure with acoustic attenuation benefits.

FIG. 3 shows the sheet metal outer perforated skin 16 of the left-hand panel 12 having convex and concave curvatures produced by a method according to the invention. As shown in FIG. 3, the sheet metal outer perforated skin 16 has been plastically stretched into a substantially convex shape about a chordwise central axis 28. In addition, portions of the sheet metal outer perforated skin 16 have been plastically stretched into substantially concave shapes about axes that are substantially parallel to the chordwise central axis 28. The methods, according to this invention, of stretch forming a thin sheet metal skin having convex and concave curvatures such as the sheet metal outer perforated skin 16 and the sheet metal inner solid skin 18 of the left-hand panel 12, and the sheet metal outer perforated skin and the sheet metal inner solid skin of the right-hand panel 14 are substantially alike. Here forward, the invention will be described and illustrated in accordance to the sheet metal outer perforated skin 16 of the left-hand panel 12.

Figure 4:
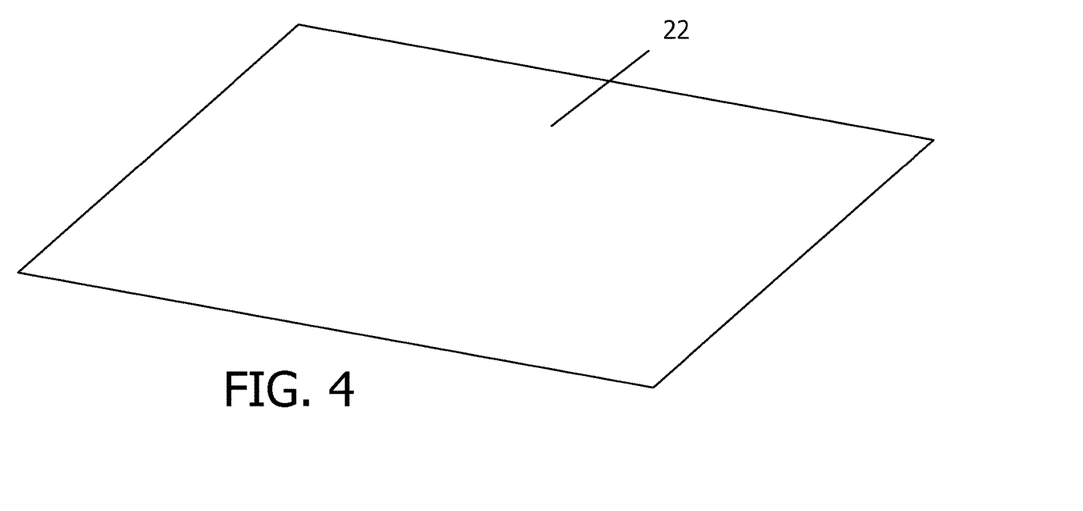
FIG. 4 is a perspective view of a substantially flat sheet of metal used to form the outer skin shown in FIG. 3.

FIG. 4 shows a substantially flat, thin-gauge metal sheet 22 from which the sheet metal outer perforated skin 16 can be formed according to the invention. In one embodiment, the sheet metal 22 is 625 Inconel having an initial nominal thickness from about 0.008 inch to about 0.012 inch. Other types, grades, and thickness of substantially ductile sheet metal also may be used. For example, the sheet metal outer perforated skin 16 can be formed by a process according to the invention from a substantially ductile metal sheet of aerospace grade aluminum, inconel, or titanium alloy having a nominal thickness between about 0.005 inch and about 0.063 inch.

Figure 5:
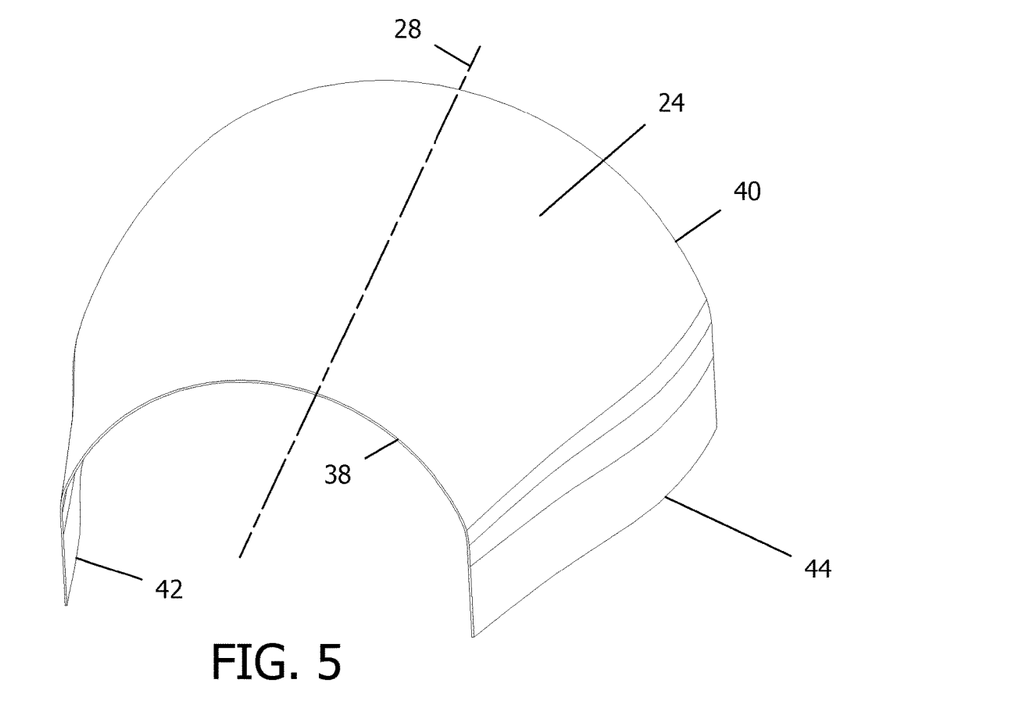
FIG. 5 is a perspective view of the partially formed outer skin shown in FIG. 3.
Figure 6:
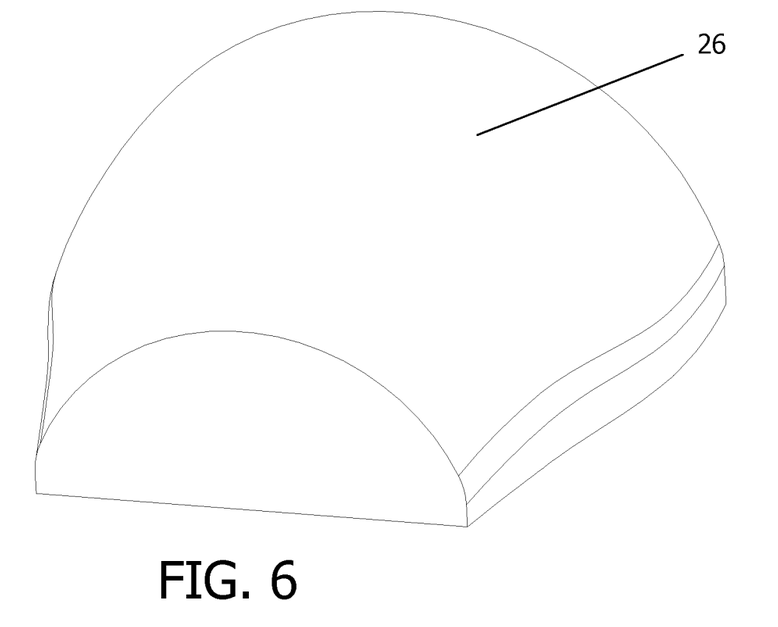
FIG. 6 is a perspective view of the stretch form mandrel used to partially form the outer skin shown in FIGS. 5 and 7.

In a process according to the invention, the metal sheet 22 can be plastically stretch formed initially into a substantially convex shape or workpiece 24 as shown in FIG. 5. The workpiece 24 has a chordwise central axis 28, and opposed ends 38, 40 and opposed edges 42, 44. The metal sheet 22 can be plastically stretch formed initially into a substantially convex shape or workpiece 24 by means of placing the metal sheet 22 over the stretch form mandrel 26 shown in FIGS. 6 and 7 and by gripping the opposed edges 42, 44 of the workpiece 24 to plastically stretch form the workpiece 24 over the stretch form mandrel 26 shown in FIG. 7. Under such conditions, the workpiece 24 undergoes substantial plastic strains in a spanwise direction between about 6 percent and about 20 percent and therefore substantially maintains the shape of the stretch form mandrel 26.

Figure 8A:
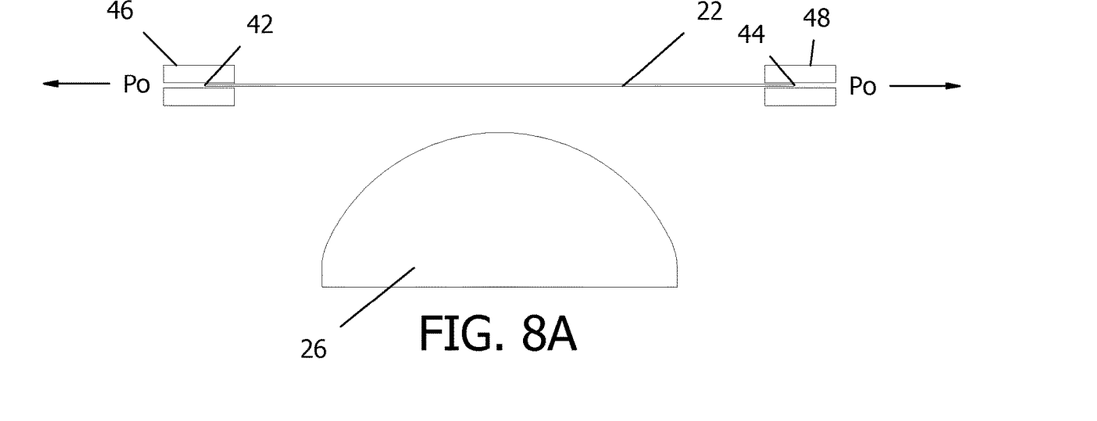
FIG. 8A is a plan view showing a starting arrangement for initial stretch forming of a substantially flat sheet of metal in position over the stretch form mandrel.
Figures 8B, 8C:
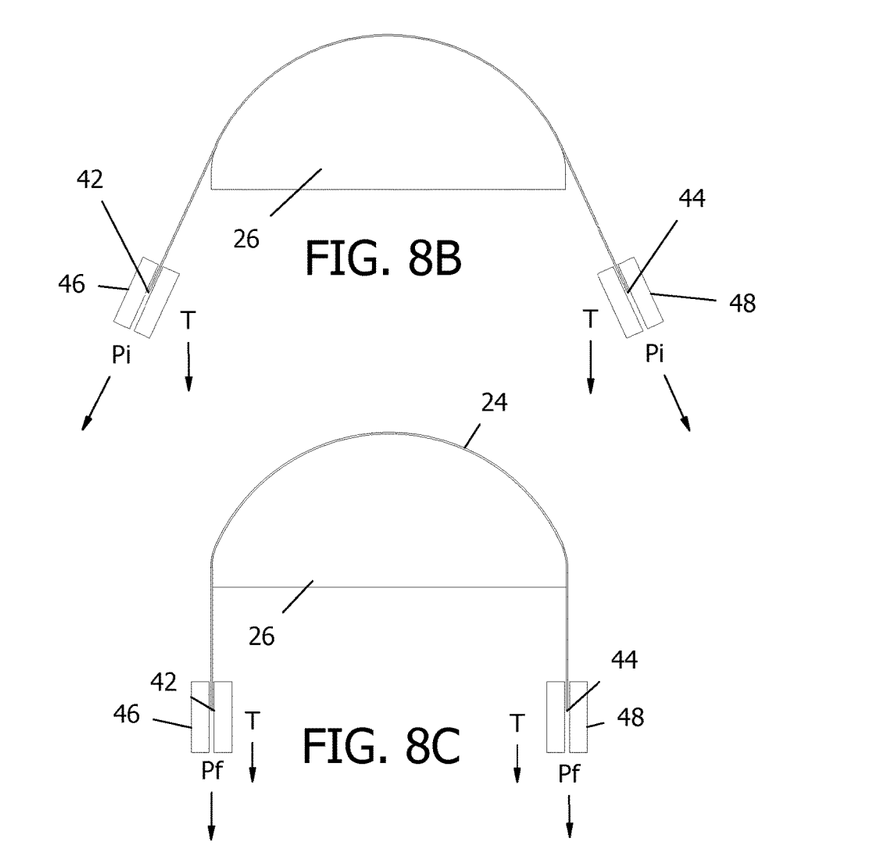
FIG. 8B is a plan view showing the sheet of metal being partially stretched around the stretch form mandrel.
FIG. 8C is a plan view showing the sheet of metal being completely stretched around the stretch form mandrel.

One embodiment of a stretch forming process according to the invention to achieve a substantially convex shape is shown in FIGS. 8A-8C. As shown in FIG. 8A, the metal sheet 22 is placed over the stretch form mandrel 26. The stretch form mandrel 26 may be constructed of any suitable material. For example, the stretch form mandrel 26 may be constructed of polyurethane or any other suitable plastic material, metal, wood, concrete, or the like. In the embodiment shown in FIGS. 8A-8C, the metal sheet 22 is tightly gripped at the opposed edges 42, 44 by opposed articulating jaws 46, 48. The articulating jaws 46, 48 are configured to withstand a tensile force "P" as the metal sheet 22 is stretch formed. The articulating jaws 46, 48 preferably are connected to articulating hydraulic cylinders (not shown) as are common in known skin press machines. The hydraulic cylinders permit monitoring of the tensile force P during stretch forming by measurement of the cylinder pressures.

FIG. 8A shows the metal sheet 22 in a starting position prior to stretch forming. In this starting position, an initial pre-tension Po is applied to the metal sheet 22 by articulating jaws 46, 48. FIG. 8B shows the metal sheet 22 during an intermediate stage of the stretch forming process. As shown in FIG. 8B, the articulating jaws 46, 48 are moved in a direction "T" while maintaining a tangent orientation to the surface of the stretch form mandrel 26. As the metal sheet 22 stretches against the outside surface of the stretch form mandrel 26, central portions of the metal sheet 22 are displaced and the metal sheet 22 begins to conform to the curvature of the stretch form mandrel 26. In addition, the metal sheet 22 is stretched in a spanwise direction between the articulating jaws 46, 48 at an applied tensile force of Pi. The process is continued until the metal sheet 22 is substantially fully stretched around the stretch form mandrel 26, and/or desired spanwise tensile forces Pf are measured at the articulating jaws 46, 48, as indicated in FIG. 8C. In one embodiment of the stretch forming process, the spanwise tensile forces Pf are about 16 tons at each end of the metal sheet 22 when the metal sheet 22 is 625 Inconel having an initial nominal thickness from about 0.008 inch to about 0.012 inch. Under such conditions, the metal sheet 22 undergoes substantial plastic strains in a spanwise direction. For example, the metal sheet 22 may undergo plastic strains between about 6 percent and about 20 percent as it is stretched into the substantially convex shaped workpiece 24 as shown in FIG. 8C. Accordingly, if the now formed substantially convex shaped workpiece 24 were to be withdrawn from the stretch form mandrel 26, the workpiece 24 substantially maintains the spanwise curvature imparted by the stretch form mandrel 26.

The workpiece 24 can be removed from the stretch form mandrel 26 as shown in FIG. 5. In addition, the workpiece 24 can be thermally treated before final forming (described below) to at least partially relieve stresses within the workpiece 24 and to stabilize the stretch-formed shape of the workpiece 24. For example, when the workpiece is fabricated from 625 Inconel having an initial nominal thickness from about 0.008 inch to about 0.012 inch, the workpiece may be thermally annealed at about 1800 degrees F. for about 15 minutes.

Figure 7:
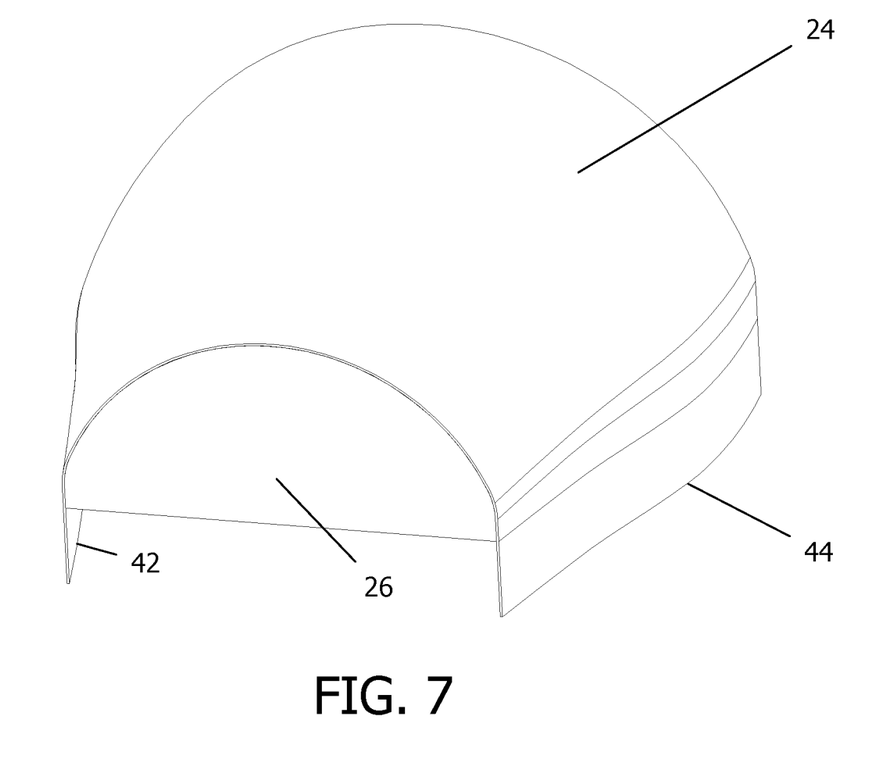
FIG. 7 is a perspective view of the partially formed outer skin shown in FIG. 5 positioned on the stretch form mandrel shown in FIG. 6.
Figure 9:
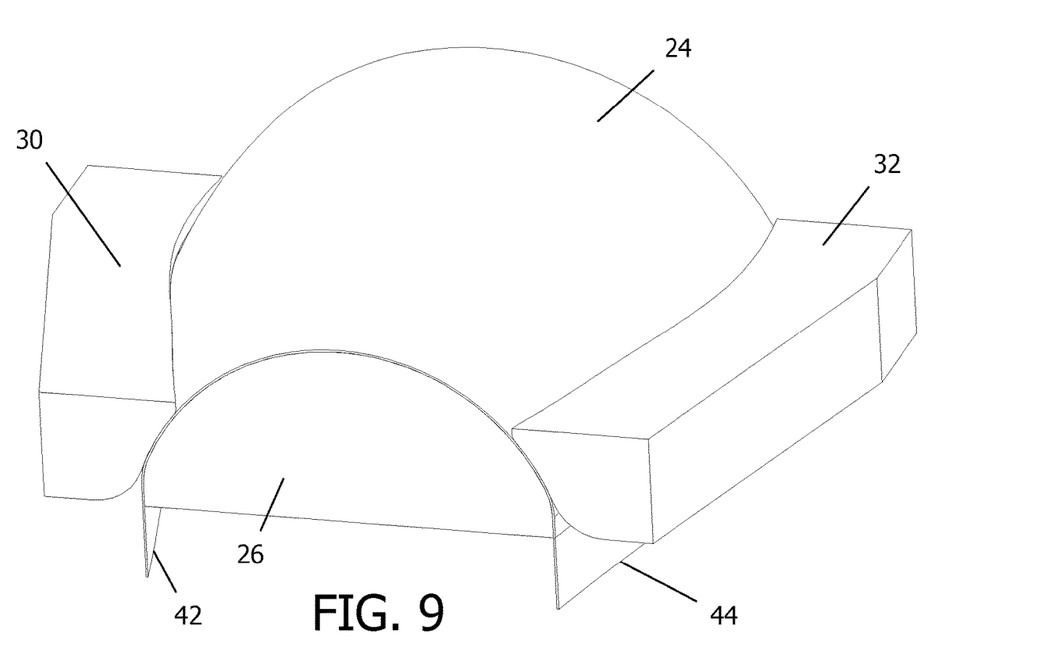
FIG. 9 is a perspective view similar to that of FIG. 7, and showing dozer blocks added to the stretch form mandrel to facilitate additional forming.

As shown in FIG. 7, the workpiece 24 has been stretch formed over the stretch form mandrel 26 resulting in a substantially convex shape as described above and as shown in FIGS. 8A-8C. In FIG. 9, dozer blocks 30, 32 are positioned over the workpiece 24 and can be attached to the stretch form mandrel 26 by suitable means (not shown). Dozer blocks 30, 32 are positioned over the workpiece 24 in a manner that allows the workpiece 24 to slip between the surface of the stretch form mandrel 26 and the surface of the dozer blocks 30, 32. Once positioned, dozer blocks 30, 32 provide additional forming surfaces that are substantially concave relative to the substantially convex shape formed previously as shown in FIG. 5.

Figure 10:
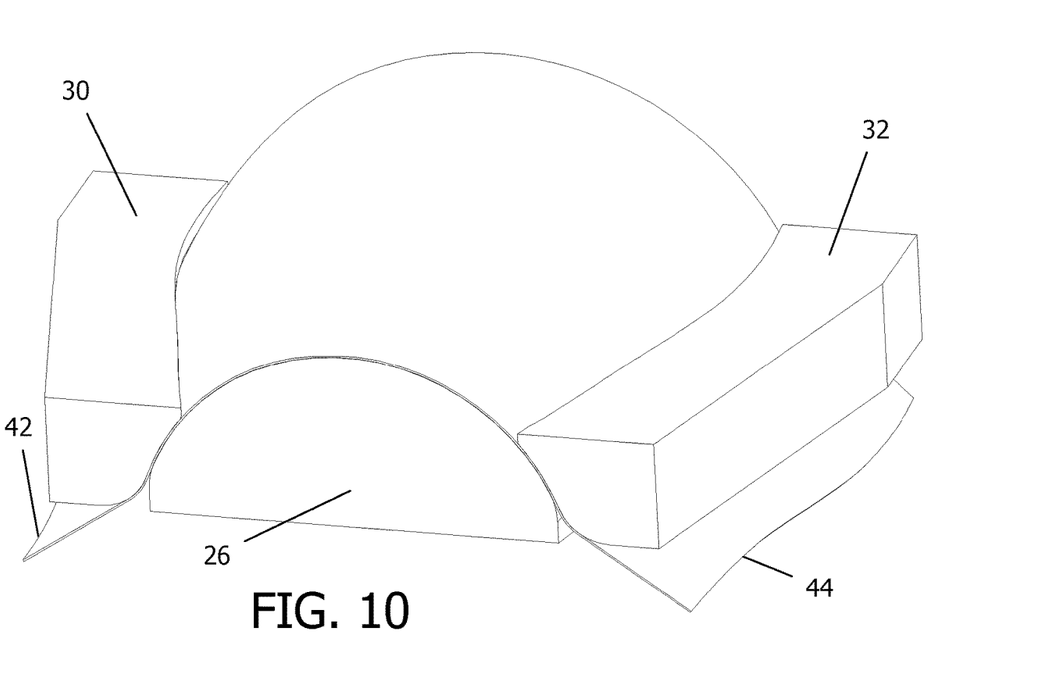
FIG. 10 is a perspective view similar to that of FIG. 9, and showing portions of the substantially convex shaped sheet of metal being partially stretched into substantially concave shapes around the added dozer blocks.
Figure 11:
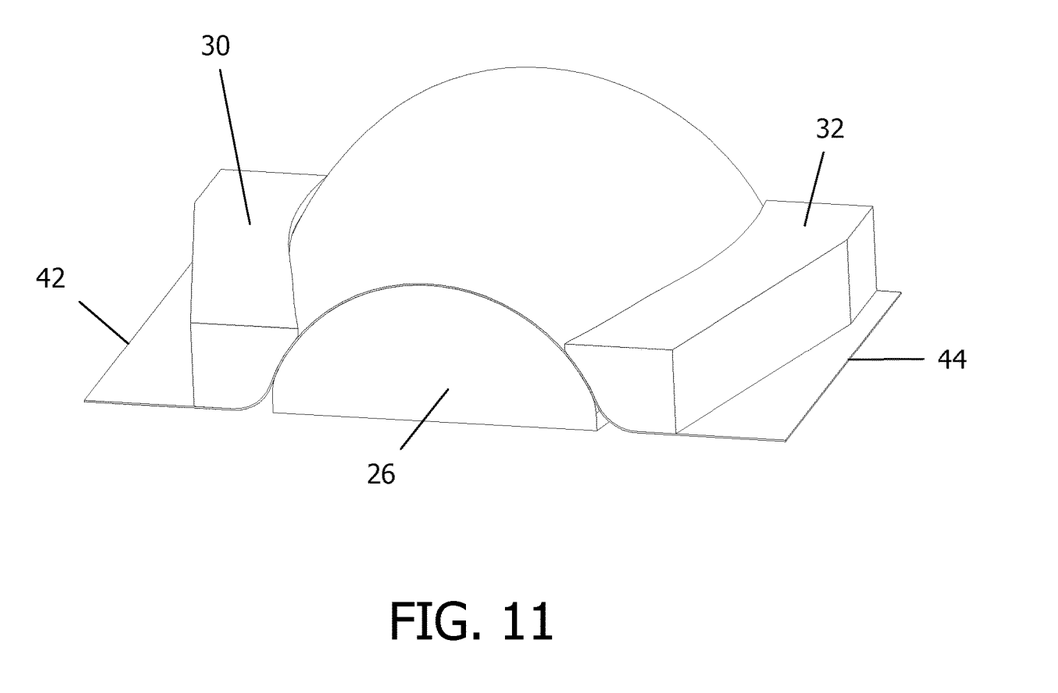
FIG. 11 is a perspective view similar to that of FIGS. 9 and 10, and showing portions of the substantially convex shaped sheet of metal being finally stretched into substantially concave shapes around the added dozer blocks.

In a process according to the invention, portions of the workpiece can be plastically stretch formed into substantially concave shapes by means of gripping the opposed edges 42, 44 and stretch forming the workpiece around dozer blocks 30, 32 as shown in an intermediate stage in FIG. 10. The process is continued until the workpiece is substantially fully stretched around the dozer blocks 30, 32 as indicated in FIG. 11.

Figure 12A:
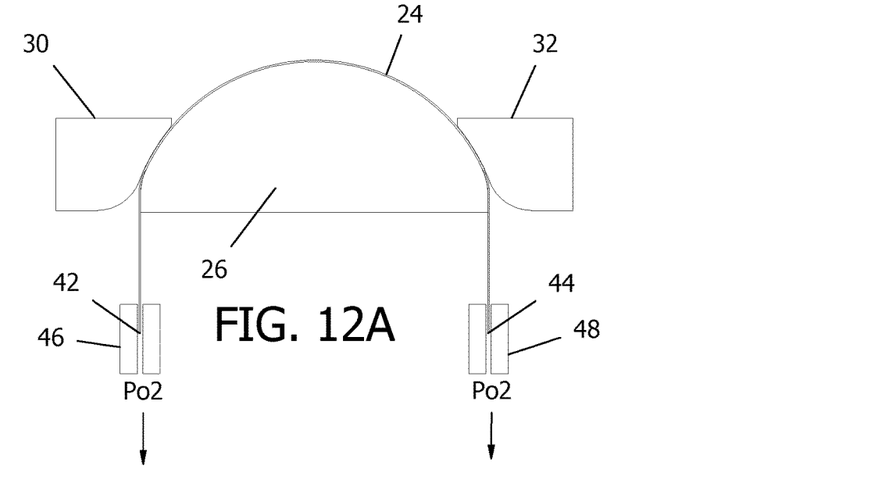
FIG. 12A is a plan view similar to that of FIG. 8C, and showing an arrangement for initial stretch forming of portions of the substantially convex shaped workpiece into substantially concave shapes around the added dozer blocks.
Figure 12B:
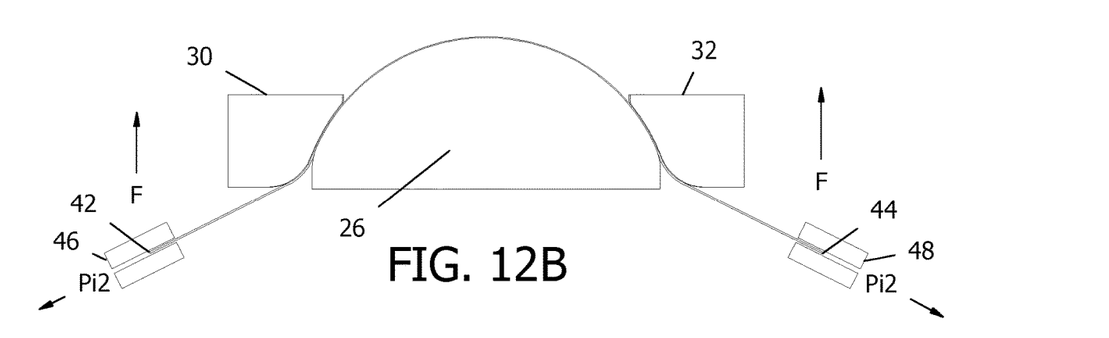
FIG. 12B is a plan view showing portions of the workpiece being partially stretched into substantially concave shapes around the added dozer blocks.
Figure 12C:
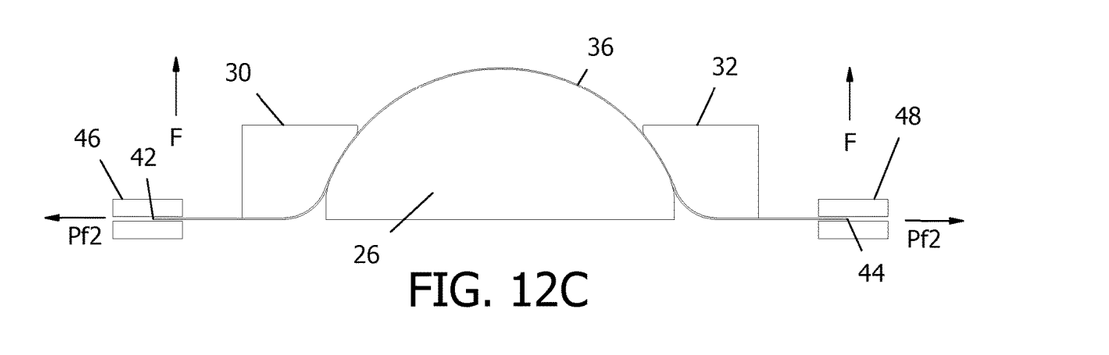
FIG. 12C is a plan view showing portions of the workpiece being finally stretched into substantially concave shapes around the added dozer blocks.

One embodiment of a stretch forming process according to the invention to achieve a substantially concave shape is shown in FIGS. 12A-12C. As shown in FIG. 12A, the workpiece 24 is positioned over the stretch form mandrel 26 and dozer blocks 30, 32 are positioned over the workpiece 24. The dozer blocks 30, 32 may be constructed of any suitable material. For example, the dozer blocks 30, 32 may be constructed of polyurethane or any other suitable plastic material, metal, wood, concrete, or the like. In the embodiment shown in FIGS. 12A-12C, the workpiece 24 is tightly gripped at the opposed edges 42, 44 by opposed articulating jaws 46, 48. The articulating jaws 46, 48 are configured to withstand a tensile force "P" as the workpiece 24 is stretch formed. The articulating jaws 46, 48 preferably are connected to articulating hydraulic cylinders (not shown) as are common in known skin press machines. The hydraulic cylinders permit monitoring of the tensile force P during stretch forming by measurement of the cylinder pressures.

FIG. 12A shows the workpiece 24 on the stretch form mandrel 26 with dozer blocks 30, 32 in position. In this starting stretch forming position, an initial pre-tension Po2 is applied to the workpiece 24 by articulating jaws 46, 48. FIG. 12B shows the workpiece being further formed during an intermediate stage of the stretch forming process. As shown in FIG. 12B, the articulating jaws 46, 48 are moved in a direction "F" while maintaining a tangent orientation to the surface of the dozer blocks 30, 32 at an applied tensile force of Pi2. As the workpiece stretches against the surface of the dozer blocks 30, 32, portions of the workpiece begin to conform to the curvature of the dozer blocks 30, 32. The process is continued until the workpiece is substantially fully stretched around the dozer blocks 30, 32, and/or desired tensile forces Pf2 are measured at the articulating jaws 46, 48, as indicated in FIG. 12C. From the starting position shown in FIG. 12A, to the fully stretched position shown in FIG. 12C, articulating jaws 46, 48 are moved in a direction "F" ranging from about 80 degrees to about 100 degrees. In one embodiment of the stretch forming process, the tensile forces Pf2 are about 16 tons at each end of the workpiece when the workpiece is 625 Inconel having an initial nominal thickness from about 0.008 inch to about 0.012 inch. Under such conditions, the workpiece undergoes substantial plastic strains. For example, the workpiece may undergo plastic strains between about 6 percent and about 20 percent as it is stretched into a fully formed sheet metal outer perforated skin 36 as shown in FIG. 12C. Accordingly, if the now fully formed sheet metal outer perforated skin 36 with convex and concave curvatures were to be withdrawn from the stretch form mandrel 26 and dozer blocks 30, 32, the fully formed sheet metal outer perforated skin 36 substantially maintains the convex and concave curvatures imparted by the stretch form mandrel 26 and dozer blocks 30, 32.

Figure 13:
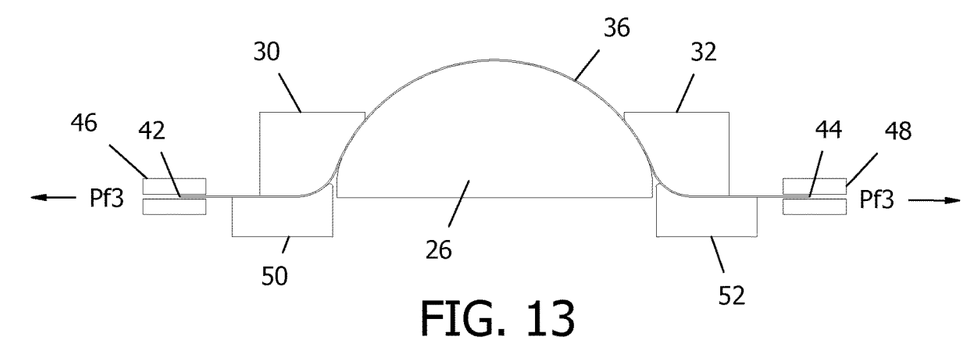
FIG. 13 is a plan view similar to that of FIG. 12C, and showing the addition of opposed dozer blocks.

FIG. 13 shows an alternative embodiment of the invention. As shown in FIG. 13, additional dozer blocks 50, 52 may be positioned substantially opposite of dozer blocks 30, 32 to sandwich portions of the workpiece between dozer blocks 30 and 50 and between dozer blocks 32 and 52. Dozer blocks 50, 52 are positioned, by suitable means (not shown), in a manner that allows the workpiece to slip between the surface of dozer blocks 30 and 50 and the surface of dozer blocks 32 and 52. Additional dozer blocks 50, 52 are positioned after the workpiece is substantially fully stretched around the dozer blocks 30, 32 as indicated in FIG. 12C. Once additional dozer blocks 50, 52 are positioned, additional forming pressure and/or desired tensile forces Pf3 are applied to the workpiece at the articulating jaws 46, 48, as indicated in FIG. 13 to further shape the workpiece if desired.

Figure 14:
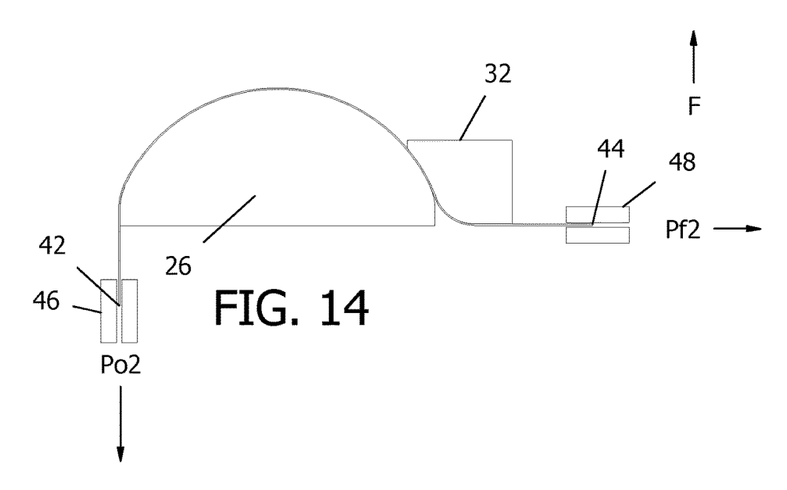
FIG. 14 is a plan view showing a portion of the workpiece being finally stretched into a substantially concave shape around an added dozer block.

FIG. 14 shows an alternative embodiment of the invention. As shown in FIG. 14, opposed edge 44 is gripped by articulating jaw 48 and moved in direction "F" to stretch the workpiece around dozer block 32. Opposed edge 42 remains in the starting position and is not further formed. The opposed edge that remained in a starting position is optional, and may be dependent upon factors such as product design, manufacturing, assembly, or service requirements.

The stretch forming operations described above may be performed on a conventional skin press machine. For example, the stretch forming operations may be performed on a numerically controlled sheet stretch form press, such as a Sheridan Model No. LV-300-72-22 150-ton sheet stretch press. Of course, other types of skin press or stretch forming devices, or other specially designed equipment also may be used in a process according to the invention.

Figure 15:
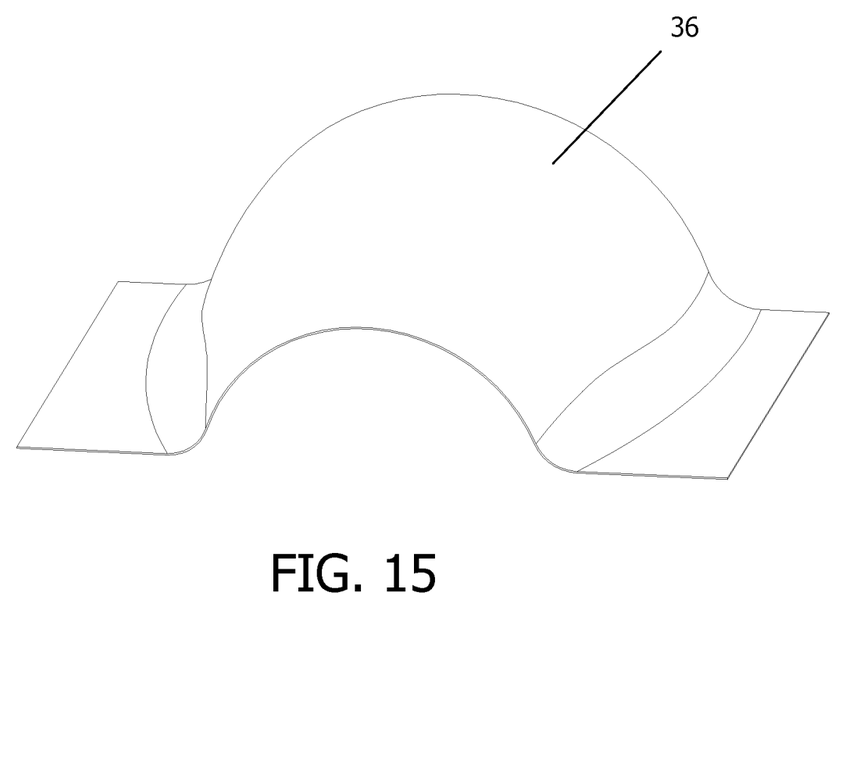
FIG. 15 is a perspective view showing the finally formed outer skin with the mandrel and dozer block or dozer blocks omitted.

After final stretch forming is completed, the articulating jaws 46, 48 are disengaged from the fully formed sheet metal outer perforated skin 36, and the fully formed sheet metal outer perforated skin 36 is removed from the stretch form mandrel 26 and dozer blocks 30, 32 as indicated in FIG. 15. Excess material is trimmed from the fully formed sheet metal outer perforated skin 36 to form a complete sheet metal outer perforated skin 16 as shown in FIG. 3. If necessary, the sheet metal outer perforated skin 16 may be hand worked or otherwise further shaped to have the desired contours of the finished sheet metal outer perforated skin 16. The sheet metal outer perforated skin 16 may be thermally treated and chemically processed in preparation for assembly or bonding.

The above descriptions of various embodiments of the invention are intended to describe and illustrate various aspects of the invention. Persons of ordinary skill in the art will recognize that various changes or modifications may be made to the described embodiments without departing from the scope of the invention. For example, though the processes described above primarily have been described regarding production of a nacelle inner fixed structure for an aircraft engine thrust reverser, persons of ordinary skill in the art will recognize that the described methods also can be used to produce other complex curved skin structures having similar configurations. In addition, whereas the stretch-forming operations are described herein as including stationary fixtures and movable gripping jaws, the stretch forming operations may be performed equally well using stationary gripping jaws and movable fixtures. All such changes and modifications are intended to be within the scope of the appended claims.

What is claimed is:

1. A method of forming an aircraft nacelle thrust reverser inner fixed structure skin, the method comprising:
   a) stretching a sheet of metal on a stretch form mandrel in a spanwise direction about a chordwise central axis, whereby said sheet of metal is plastically deformed into a workpiece having a substantially convex first shape, opposed first and second ends, and opposed first and second edges;
   b) positioning a first dozer block and a second dozer block over said workpiece;
   c) moving a first articulating jaw that is gripping said opposed first edge in a direction that stretches said workpiece about said first dozer block, whereby said workpiece is plastically deformed into a substantially concave second shape about an axis that is substantially parallel to said chordwise central axis;
   d) moving a second articulating jaw that is gripping said opposed second edge in a direction that stretches said workpiece about said second dozer block, whereby said workpiece is plastically deformed into a substantially concave third shape about an axis that is substantially parallel to said chordwise central axis;
   e) adding a third dozer block adjacent to said first dozer block after said workpiece is plastically deformed into said substantially concave second shape about said axis that is substantially parallel to said chordwise central axis;
   f) applying additional force to said first articulating jaw, whereby said substantially concave second shape is maintained and workpiece is plastically deformed into the aircraft nacelle thrust reverser inner fixed structure skin.

2. A method according to claim 1, and further comprising:
   a) adding a fourth dozer block adjacent to said second dozer block after said workpiece is plastically deformed into said substantially concave third shape about said axis that is substantially parallel to said chordwise central axis;
   b) applying additional force to said second articulating jaw, whereby said substantially concave third shape is maintained.

\* \* \* \* \*